April 18, 1933.  R. J. O'BRIEN  1,904,007
JOURNAL CUSHION
Filed July 25, 1929
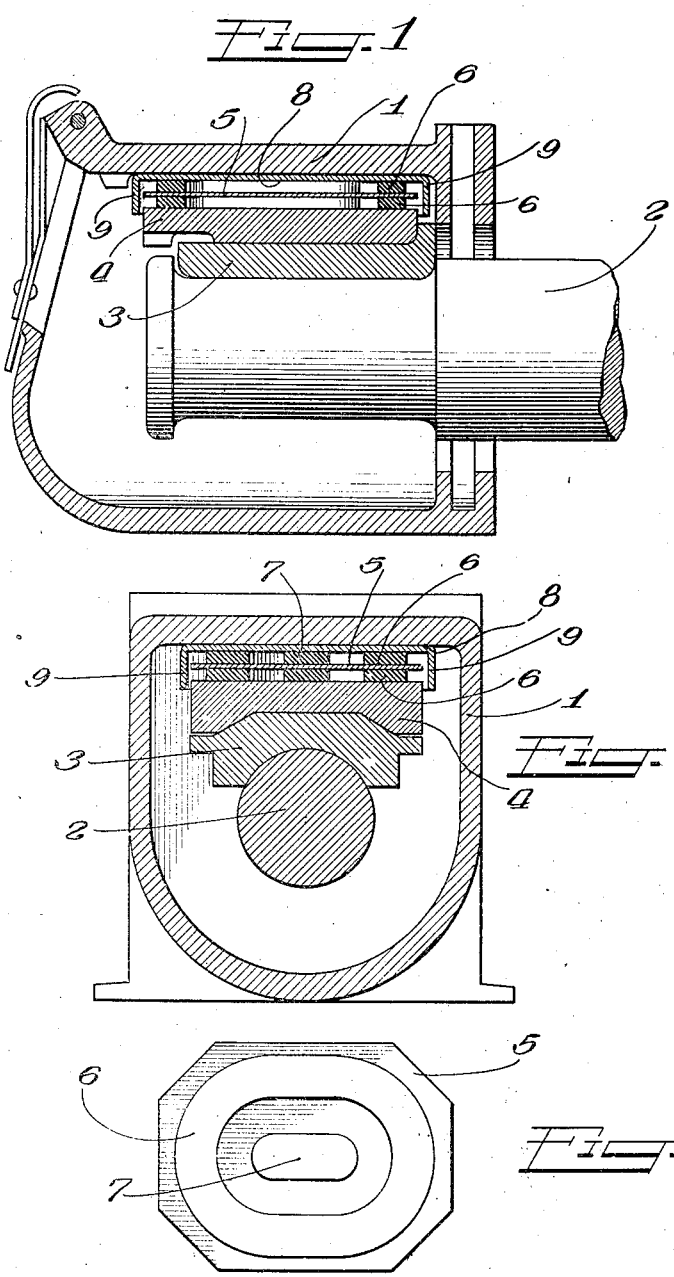
Inventor:
Richard J. O'Brien
by Charles Hill Patented Apr. 18, 1933

1,904,007

UNITED STATES PATENT OFFICE

RICHARD J. O'BRIEN, OF DEPEW, NEW YORK, ASSIGNOR TO WAUGH EQUIPMENT CO., OF DEPEW, NEW YORK, A CORPORATION OF MAINE

JOURNAL CUSHION

Application filed July 25, 1929. Serial No. 380,885.

This invention relates to a journal cushion for vehicles such as railroad cars or the like and concerns itself with a cushion that is adapted for yielding expansion with means to limit such expansion whereby a good yield and cushioning effect is obtained at all times.

In cars used for transporting passengers, noises, vibrations and shocks resulting from contact of the wheel treads and flanges with the running rails are transmitted from the rails up through the wheels, axles, bearings, equalizers and other parts of the truck to the car under frame and body. By effectively breaking the metallic contact at the various points, such noises, shocks and the like are prevented from reaching the car body and causing annoyance and discomfort to the occupants, especially during night travel in sleeping cars.

The invention comprises the novel structure and combination of parts hereinafter described and more particularly pointed out and defined in the appended claims.

In the accompanying drawing which illustrates a preferred form of this invention and in which similar reference numerals refer to similar features in the different views:

Figure 1 is a longitudinal sectional view thru a journal box involving this invention.

Figure 2 is a transverse sectional view thru the journal box.

Figure 3 is a plan view of a resilient cushion involving a part of the journal box.

In the drawing, there is shown a journal box 1 of usual construction into which a vehicle axle 2 extends. The usual bearing 3 is located upon the axle and the filler block 4 is superposed upon the bearing 3.

According to this invention, a resilient cushion is interposed between the filler block 4 and the top wall of the journal box and is retained for a certain amount of expansion which is limited to such an extent that a good yield and cushion effect is always maintained. The cushion is shown as consisting of a central plate 5 having expansible rubber elements or the like upon both sides. In the present instance there is a rubber ring 6 upon each side with an oblong rubber piece 7 intermediate each ring as shown in Figure 3.

A retainer 8 provided with marginal depending flanges 9 fits over the cushion for retaining the same in position and for limiting the expansion thereof by means of the depending flanges.

According to this construction, the journal will always afford a good yield even when expanded to the full extent of the retainer.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. The combination of a journal box, a filler block, a journal bearing supporting said block, and a shock absorbing device between the filler block and the top of the box comprising a retainer having depending flanges, and a resilient cushion comprising a plate having rubber annuli on each face thereof in said retainer.

2. The combination of a journal box, a filler block, a journal bearing supporting said block, and a shock absorbing device between the filler block and the top of the box comprising a retainer having depending flanges surrounding the upper part of said block, and a resilient cushion comprising a plate having rubber annuli on each face thereof in said retainer.

3. The combination of a journal box, a filler block, a journal bearing supporting said block, and a shock absorbing device between the filler block and the top of the box comprising a retainer having depending flanges surrounding the upper part of said block, and a rubber cushioning device comprising a plate having rubber annuli on each face thereof in said retainer.

In testimony whereof I have hereunto subscribed my name at Chicago, Cook County, Illinois.

RICHARD J. O'BRIEN.